United States Patent
Horsley

(10) Patent No.: US 10,389,548 B2
(45) Date of Patent: Aug. 20, 2019

(54) DIGITAL ADSL REGENERATOR DEVICE WITH ADAPTIVE DATA FORWARDING

(71) Applicant: BRITISH TELECOMMUNICATIONS PUBLIC LIMITED COMPANY, London (GB)

(72) Inventor: Ian Horsley, London (GB)

(73) Assignee: BRITISH TELECOMMUNICATIONS public limited company, London (GB)

(*) Notice: Subject to any disclaimer, the term of this patent is extended or adjusted under 35 U.S.C. 154(b) by 143 days.

(21) Appl. No.: 15/504,435

(22) PCT Filed: Aug. 19, 2015

(86) PCT No.: PCT/EP2015/069033
§ 371 (c)(1),
(2) Date: Feb. 16, 2017

(87) PCT Pub. No.: WO2016/026892
PCT Pub. Date: Feb. 25, 2016

(65) Prior Publication Data
US 2018/0227142 A1    Aug. 9, 2018

(30) Foreign Application Priority Data
Aug. 19, 2014 (GB) .................................. 1414679.9

(51) Int. Cl.
*H04M 1/00* (2006.01)
*H04L 12/28* (2006.01)
(Continued)

(52) U.S. Cl.
CPC .......... *H04L 12/2869* (2013.01); *H04B 3/36* (2013.01); *H04B 3/38* (2013.01); *H04B 3/46* (2013.01);
(Continued)

(58) Field of Classification Search
CPC ... H04L 12/2869; H04L 1/0002; H04L 25/20; H04B 3/36; H04B 3/38; H04B 3/46; H04M 11/062
(Continued)

(56) References Cited

U.S. PATENT DOCUMENTS 6,108,350 A   8/2000  Araujo et al.
6,728,216 B1  4/2004  Sterner
(Continued)

FOREIGN PATENT DOCUMENTS

GB    2529421    2/2016

OTHER PUBLICATIONS

International Search Report for PCT/EP2015/069033, dated Nov. 13, 2015, 4 pages.
(Continued)

*Primary Examiner* — Md S Elahee
(74) *Attorney, Agent, or Firm* — Nixon & Vanderhye P.C.

(57) ABSTRACT

Regenerator devices (30) for use with Digital Subscriber Line (DSL) connections are disclosed which forward user data received in a modulated signal from one link (L1) of a DSL connection on to another link (L2) of the DSL connection. Such devices comprise a first transceiver module (302) which receives a modulated signal from the first link and demodulates it whereby to obtain user data, and a second transceiver module (306) which receives the user data obtained by the first transceiver module and transmits a modulated signal carrying it on to the other link. The device further comprises a performance analyzer (308) which obtains performance information in respect of the second link, and a profile management processor (307) which determines a profile to be applied in respect of the second link in dependence on the performance information obtained in respect thereof. An access net work including
(Continued)

one or more such devices and associated methods are also disclosed.

25 Claims, 4 Drawing Sheets

(51) Int. Cl.
| | |
|---|---|
| H04L 25/20 | (2006.01) |
| H04B 3/38 | (2006.01) |
| H04M 11/06 | (2006.01) |
| H04B 3/36 | (2006.01) |
| H04B 3/46 | (2015.01) |
| H04L 1/00 | (2006.01) |
| H04M 3/30 | (2006.01) |
| H04L 12/64 | (2006.01) |

(52) U.S. Cl.
CPC ............ *H04L 1/0002* (2013.01); *H04L 25/20* (2013.01); *H04M 11/062* (2013.01); *H04L 2001/0097* (2013.01); *H04L 2012/6478* (2013.01); *H04M 3/304* (2013.01)

(58) Field of Classification Search
USPC ............................ 379/340; 370/235, 468; 1/1
See application file for complete search history.

(56) References Cited

U.S. PATENT DOCUMENTS

| | | |
|---|---|---|
| 7,257,220 B1 | 8/2007 | Marshall et al. |
| 2002/0141443 A1 | 10/2002 | Christensen et al. |
| 2005/0013301 A1 | 1/2005 | Bouchat et al. |
| 2005/0169315 A1 | 8/2005 | Jiang et al. |
| 2005/0237940 A1* | 10/2005 | Tennyson ................ H04L 12/42 370/235 |
| 2006/0062209 A1 | 3/2006 | Riley |

OTHER PUBLICATIONS

Written Opinion of the ISA for PCT/EP2015/069033, dated Nov. 13, 2015, 6 pages.
Search Report for GB 1414679.9, dated Feb. 5, 2015, 4 pages.
Search Report for GB 1414687.2, dated Feb. 6, 2015, 4 pages.
TR-252, xDSL Protocol-Independent Management Model, Broadband Forum Technical Report, Issue 1, Nov. 2010, 39 pages.
Digital ADSL Regenerator, http://www.dension.com/ch/business/produkte/telecommumcation/digital-adsl-regenerator, Jul. 2014, Google's cache of http://www.dension.com/ch/business/produkte/telecommunication/digital-adsl-regenerator. it is a snapshot of the page as it appeared on Jan. 21, 2017 19:16:11 GMT. The current page could have changed in the meantime. Learn more (6 pages).
TR-069—CPE WAN Management Protocol, Broadband Forum Technical Report, Issue 1, Amendment 5, Nov. 2013, 228 pages.

* cited by examiner

DIGITAL ADSL REGENERATOR DEVICE WITH ADAPTIVE DATA FORWARDING

This application is the U.S. national phase of International Application No. PCT/EP2015/069033 filed 19 Aug. 2015, which designated the U.S. and claims priority to GB Patent Application No. 1414679.9 filed 19 Aug. 2014, the entire contents of each of which are hereby incorporated by reference.

TECHNICAL FIELD

The present invention relates to regenerator devices for use with Digital Subscriber Line connections, to access networks including such devices, and to associated methods.

BACKGROUND TO THE INVENTION AND PRIOR ART

A Digital Subscriber Line (DSL) connection is a connection that allows for the provision of digital communication over an existing copper subscriber line. DSL is a collective term to cover a number of versions of DSL technology, including ADSL ("Asymmetric" DSL), SDSL ("Symmetric" DSL), ADSL2+(a technique that extends the capability of basic ADSL by doubling the number of downstream channels), VDSL (Very-high-bit-rate DSL), VDSL2 (an improved version of VDSL), and others, such as "G.fast".

In general, a DSL connection comprises a copper subscriber line (strictly, a twisted pair formed from a copper loop) extending between two DSL modems. A "customer-side" DSL modem (or "user modem") is typically located at the customer's premises, while an "operator-side" modem may be located at the local exchange (known as the 'central office' (CO) in US terminology), in a street cabinet, or at a drop point or distribution point (DP).

Typically, the local exchange, street cabinet, drop point or distribution point includes a DSL Access Multiplexer (DSLAM), which is a form of aggregation transceiver device comprising several DSL modems, one for each subscriber line served by the DSLAM. The DSLAM serves as the interface between copper DSL connections from customers' premises and the (generally faster) optical fibre connections of the Core Network. It is generally also connected to a network management system.

A DSL connection between a DSLAM and a user modem may simply be operated at a fixed, pre-agreed rate, but in general, broadband communication providers offer their customers a rate-adaptive broadband service, according to which the connection is set up at or near the highest rate which the line can support at the time of set-up, then varied in response to indications that the current rate can or should be increased or decreased. As such, lines generally tend to be operating at or near the limit of what is achievable, leading to a risk that their rates may be such that they become unstable. This can lead to excessive errors and even drop-outs where the connection is lost completely and needs to be completely re-established (with a lengthy initial handshake period being repeated each time, referred to as a "sync", a "re-synch" or a "re-train").

Dynamic Line Management (DLM) is a technique for monitoring the behaviour of DSL lines and dynamically modifying certain parameters in response to the observed behaviour. In overview, it generally involves assessing at least the stability of a line then adjusting parameters which can affect the likelihood of re-synchs occurring (for example the depth of interleaving, the amount of redundancy built into the encoding used, etc.) to try to find and maintain an appropriate balance between the line-rate and a desired level of stability. Typically this is done by selecting from a number of different DLM "profiles" having various different sets of values for the parameters likely to have an impact on the stability or otherwise of DSL connections and moving a particular connection between profiles until one is found which provides an acceptable balance between rate and stability. Profiles are applied at the DSLAM.

A single profile normally contains a complete set of all the configuration parameters and values required for a line. Many hundreds of different profiles may be available to a DLM system of which only one is applied to each line at each time. Often a degree of freedom that is added to DLM control increases the dimension of the profile space and hence greatly increases the number of profiles defined and used.

Broadband forum recommendation TR-252, Issue 3 provides for a vector of profiles (VoP), which is a set of N independent profiles, each profile containing a unique set of DSL modem configuration parameters and the value of each vector index referencing specific values of the parameters. Using a vector of profiles can significantly reduce the number of profiles required to manage a network.

Typically, profiles may be thought of as ranging between "more aggressive" and "less aggressive", where more aggressive profiles tend to provide better services to users in terms of higher bit rates and lower latencies, but are more likely to result in lines being unstable, whereas less aggressive profiles tend to offer lower bit rates and/or latencies but greater stabilities. While higher rates and better stability are both desirable characteristics, an appropriate trade-off between them may depend on factors such as current and previous conditions, the type(s) and/or preference(s) of users of devices using networked devices served by the lines, and the networked applications they are currently using.

It is thus desirable that the profile and/or individual parameters applied in respect of a particular line can be adjusted on an ongoing basis in response to factors such as (potentially changing) user preferences and current or past usage as well as the monitored performance of the line.

Generally, in relation to DSL technology, it is well-known that speed and performance drop off markedly with increasing line length. In urban areas, this problem is generally being circumvented by bringing the fibre network and DSLAMs closer to customer premises (i.e. to the cabinet, to the drop-point, or to the premises itself), thereby shortening (or replacing) the part served by copper lines. In more rural areas, this may not be economically-justifiable. Instead, it is known for devices known as "Regenerators" to be used for customers in such rural areas whose premises are a large distance from the nearest DSLAM.

A DSL regenerator is a device that can be incorporated into a DSL connection between the DSLAM and the customer's modem to improve the performance or reach of the DSL service without needing to move the DSLAM and fibre backhaul closer to the customer premises. A regenerator generally contains a CPE chipset (including a modem) and a DSLAM chipset (also including a modem), and an Ethernet bridge between the two chipsets to transfer data between the respective links, effectively making the regenerator transparent (in both directions) to user data. A regenerator demodulates the received signal from either side to a binary signal before re-modulating the binary signal back into a transmission frequency for onward transmission, so theoretically there is no limit to the number of regenerators that can be included on a line (unlike amplifiers, which instead increase the signal level of analogue transmission signals).

Regenerators effectively split existing longer DSL connections into two or more shorter DSL links or segments, each link or segment being a twisted copper pair or "loop" capable of providing the improved speed and performance that a shorter link can provide. Each segment is then effectively an independent DSL circuit, and thereby has the normal potential data-collection and management requirements of a DSL circuit. As will be appreciated, however, for an operator to perform data-collection and management in respect of a DSL circuit, the operator needs suitable communication channels to/from the circuit and/or to devices linked to it, and in the case where a DSL connection from an operator-side DSLAM (in an exchange, for example) to a customer modem is split using a simple regenerator, the operator will generally only have direct communication with the segment from the operator-side DSLAM to the regenerator.

For a normal connection comprising a single DSL circuit, the operator generally collects DSL performance data, analyses it and applies a profile to modify the circuit operation and maintain a desired performance. The performance data and profile configuration for VDSL2 is defined in the standard G.993.2. There is normally a DLM system in the operator's Operational Support System (OSS) that processes the data and chooses appropriate profiles for each line under its control.

The functionality of a complete DLM system and of an OSS in general will not be described in detail here—DLM algorithms for managing stability and/or for balancing speed against stability are well known—and they are not shown in full in FIG. 1 (discussed below). Instead, the functionality of the OSS and of a DLM system insofar as it affects the DSL connection between the exchange DSLAM 12 and the CPE 18 is represented by OSS 14 and DLM Engine 16. Generally, however, DLM systems analyse performance data from DSL lines connected to a DSLAM under their control and select suitable profiles to be applied in respect of those lines in order to trade stability and performance, as indicated earlier.

Briefly, a typical DLM process may involve the following steps being performed in respect of each line:
1. Data is collected from the line in respect of short periods (15 minute periods, for example).
2. The data is aggregated over a longer period (a day, for example), with performance issues such as the number or rate of errors and/or retrains in the longer period, the minimum and/or maximum rate in the longer period, for example, being monitored.
3. The performance of the line is categorised with reference to predetermined performance thresholds (relating to errors, rates, latency and/or retrains, for example).
4. A DLM algorithm is run to determine whether (and if so, how) to change the profile for the line. If the number of errors is above an "error" threshold, error protection may be enabled, for example, or a line-rate cap may be reduced.
5. If applicable, the relevant DSLAM for the line is instructed to apply the newly-determined profile to the line in the network, such that transmissions over the line are made in accordance therewith.

Of the above steps, some or all may be performed by a functional module referred to as a DLM engine. Steps 3 and 4 in particular are the key DLM processing steps.

DLM algorithms may take into account user settings such as configuration parameters or targets selected by users and/or by communication providers (CPs), as well as performance data. These user settings may indicate whether the DLM processing should prioritise speed, stability or other issues, and may be set differently for different particular users or different categories or users, possibly based on preferences specified by the users themselves, possibly based on observations by CPs of the type of networked applications the users habitually use, or otherwise.

FIG. 1 illustrates the principal functional modules involved in the operation of a standard DSL regenerator being used on a DSL connection located between a network operator's DSLAM (which, in the case of an ADSL connection, would be located in the exchange) and Customer-Premises Equipment (CPE) at the boundary of a user's local network.

In FIG. 1, a regenerator 10 is used on a DSL connection between a modem in a DSLAM 12 in an exchange and a modem in the CPE 18 via which a customer's networked user devices may be connected, splitting the connection into two links L1 and L2. Link L1 is connected to the regenerator 10 via a CPE chipset 102 which (from the point of view of the exchange DSLAM 12) mirrors the functionality of the CPE modem 18. Link L2 is connected to the regenerator 10 via a DSLAM chipset 106 which (from the point of view of the CPE modem 18) mirrors the functionality of the exchange DSLAM 12. In each case, the modems on the customer's DSL connection are shown as "M". An Ethernet bridge 104 carries data received via one link (the data having been demodulated by the modem in one chipset) to the other chipset at which it is re-modulated for onward transmission over the other link, such that the two links effectively convey user data along the whole of the customer's DSL connection (symbolised by the dotted "Data Link" line) as if it were one link.

If a standard regenerator is installed in a standard DSL connection as shown in FIG. 1, by default, any performance data received by the DLM Engine 16 (via the OSS management channel 14) will be in respect of link L1, and any new DLM profile will be applied in respect of link L1, since this is the link connected to DSLAM 12. More generally, it will be apparent that two scenarios exist:
(i) The regenerator may be installed without additional management/communication channels thereto; or
(ii) Additional management/communication channels may be made to the regenerator.

In scenario (i), the operator may (effectively) be blind to the additional link L2 (and any further links), making collection of performance data and diagnosis of faults thereon impractical. Further, the operator may be unable to reconfigure or control it (or them) individually at all, let alone in response to performance measurements in respect thereof as would be done in respect of the link L1 from the operator's DSLAM 12.

For scenario (ii), incorporating additional management/communication channels to the regenerator and suitable OSS interconnections to manage link L2 (and any further links) is possible, but this involves significant additional cost and complexity.

FIG. 2 illustrates the principal functional modules involved in the operation of a possible more complex DSL regenerator than the standard regenerator 10 of FIG. 1. The regenerator 20 of FIG. 2 is similar to that of FIG. 1 in that it is used on an ADSL connection between an exchange DSLAM 22 and a modem in CPE 28, with link L1 being connected to the regenerator 20 via a CPE chipset 202 and link L2 being connected to the regenerator 20 via a DSLAM chipset 206 such that the two links effectively convey user data along the whole connection (again symbolised by the dotted "Data Link" line) as if it were one link or V-LAN. An Ethernet Bridge 204 carries data received via one link L1/L2 (and demodulated by the modem in one chipset) to the other chipset for re-modulation and onward transmission over the other link L2/L1, such that the two links effectively convey user data along the whole of the connection (again symbolised by the dotted "Data Link" line) as if it were one link. In this case, however, an additional modem pair 25, 205 may be used to allow performance data to be collected by the operator from the regenerator. For this, a control module 208, which may hold pre-set configuration information for the regenerator, may also collect performance data from the chipsets and provide it to modem 205, which can send it over a management link LM via modem 25 and the OSS 24 to an operator-side Element Management System (EMS) 27. This separate management channel is symbolised by the dotted "Management Link" line.

A known regenerator, referred to as the "Digital ADSL Regenerator" (DAR) is discussed at http://www.densionbroadband.com/data/downloads/brochure_dar.pdf. This corresponds essentially to the device explained with reference to FIG. 2 above. This device connects up to four ADSL subscriber lines from an exchange, and uses an additional copper pair to connect a power unit to the device. This is said not only to provide power for the device but also to include a network management circuit, enabling supervision, monitoring and configuring of the equipment. It will be noted that there is no suggestion that any DLM processing is performed on the device, however, let alone that any information is provided to the device that may then be used in any such DLM processing.

Data concerning lines to end-user devices such as CPE devices can be collected by an operator and used for automatic configuration of such devices according to the CPE WAN Management Protocol (CWMP) or TR-069 protocol (Technical Report 069 of the Broadband Forum), which defines a bi-directional application layer protocol for remote management of end-user devices, allowing communication between Internet access devices such as modems, routers, gateways, set-top boxes, VoIP-phones, etc. and Auto Configuration Servers (ACS). It would therefore be foreseeable, in cases where standard regenerators are used, for an operator to collect data over the TR-69 protocol from the customer modem relating to the performance of customer-side links (such as links L2 in FIGS. 1 and 2), which could then be used by the operator's DLM system to select a profile to be applied to operator-side links (such as links L1 in FIGS. 1 and 2). TR-69 data collection is often unreliable, however. Further, this still does not allow for DLM processing to be done and for DLM profiles to be applied by or via the modem in the DSLAM chipset on a regenerator in respect of a link such as L2 (i.e. between a regenerator and a customer) in the manner that is done in respect of a link such as L1 from an operator-side modem.

Even if a sufficiently capable control module on a regenerator were to exist and be configured to cause the same profile to be applied in respect of the customer-side link as has been applied in respect of the operator-side link, while it may then be possible for an operator's DLM system to select the fastest profile that would stabilise both links and apply this to the operator-side link (i.e. indirectly causing that same profile to be applied by the regenerator in respect of the customer-side link), having the same profile for both links would generally result in lower performance levels than necessary, particularly on account of the likely disparity between the respective lengths, conditions, performance levels and capabilities of the individual links either side of the regenerator.

Referring briefly to prior art patent documents, US patent application US2006/0062209 (Riley) relates to methods for dynamic rate adaptation based on selective passive network monitoring. More specifically, it relates to a method for managing a session over a network that involves multiple end-points obtaining services via an application server, wherein, after the end-points have registered with the application server for the session, initial policies are established for network traffic flows for each end-point participating in the session; information is then determined about the network traffic flows for at least some of the end-points participating in the session; from the information determined about the network traffic flows, an identification is made as to which of the end-points is functioning as a host server for the session; then new policies are established for network traffic flows for the end-points, wherein under the new policies fewer network resources are reserved for each of the multiple end points other than and as compared to the end point functioning as the host server.

US application US2005/0169315 (Jiang) relates to systems and methods for accessing DSL data, and specifically to a method involving receiving a requested phone number corresponding to a DSL element; mapping the number to a port address for a DSLAM in communication with the (remotely-located) DSL element; sending an interrogation request to the port address of the DSLAM to interrogate the DSL element; collecting raw performance data of the DSL element; converting the raw performance data to analysed performance data; and displaying the analysed performance data.

SUMMARY OF THE INVENTION

As explained earlier, while regenerators are effectively transparent to user data, the DSL links either side of them serve as independent DSL circuits each having the performance data collection and DLM possibilities thereof. A network operator will generally only have direct access to performance data relating to an operator-side link (i.e. a link between the operator's DSLAM and a regenerator (or the first regenerator if there is more than one on the line)), and direct control for DLM purposes thereof, however. To allow remote links to be monitored and subjected to DLM, it would be possible to build monitoring and management channels to regenerators (with suitable OSS interconnections), but the cost of this generally negates the cost advantage of using regenerators. Without such communication channels, current regenerators do not allow network operators to adjust the DLM profile for a customer-side link independently of the profile on the associated operator-side link, let alone in dependence on performance of the customer-side link (which is likely to differ from that of the associated operator-side link) according to a DLM algorithm that may be remotely reconfigured while in use by the operator.

According to a first aspect of the invention, there is provided a regenerator device for forwarding user data received in a modulated signal from one link of a Digital Subscriber Line, DSL, connection on to another link of the DSL connection, the device comprising:

a first transceiver module operable to receive a modulated signal from a first link of a DSL connection and to demodulate the received signal whereby to obtain user data;

a second transceiver module operable to receive user data obtained by the first transceiver module and to transmit a modulated signal carrying the user data on to a second link of the DSL connection;

the device further comprising:

a performance analyser operable to obtain performance information in respect of the second link of the DSL connection; and a profile management processor operable to determine a profile to be applied in respect of the second link, the profile specifying a set of values for one or more parameters associated with the second link, the profile being determined by the profile management processor in dependence on the performance information obtained in respect of the second link;

wherein the second transceiver module is operable to transmit a modulated signal carrying the user data on the second link in accordance with the profile determined by the profile management processor.

According to preferred embodiments, the device may also be operable to receive profile determination preference information, and the profile management processor may be operable to determine the profile to be applied in respect of the second link in dependence on the profile determination preference information and on the performance information obtained in respect of the second link. Such profile determination preference information may be provided by the network operator or service provider, or may be provided by the client, and may indicate, for example, whether speed is of greater importance than stability in relation to the determination of the profile to be applied in respect of the line.

According to preferred embodiments, the signal received from the first link of the DSL connection by the first transceiver module carries configuration information in respect of the DSL connection, and the first transceiver module is operable to demodulate the received signal whereby to obtain user data and configuration information. With such embodiments, the device may further comprise a configuration analyser operable to obtain, from the configuration information obtained by the first transceiver module (through demodulation of the received signal), profile determination preference information in dependence on which the determination of the profile to be applied in respect of the second link may then be made by the profile management processor. With such embodiments, the configuration information may comprise values for a set of parameters each having a first pre-defined meaning according to a first pre-defined communication protocol, and the configuration analyser may be operable to interpret a subset of one or more parameters from the set of parameters according to a second pre-defined communication protocol as having a second pre-defined meaning, the second communication protocol differing from said first communication protocol, and the second meaning differing from the first meaning, thereby to derive the profile determination preference information from the values for the one or more parameters in the subset of parameters. Such embodiments allow profile determination preference information to be provided over an existing communication channel between an operator-side DSLAM and a regenerator using existing but essentially redundant DSL parameters for a new purpose.

According to preferred embodiments, the profile management processor may be operable to determine a profile to be applied in respect of the second link by selecting a profile from a plurality of stored profiles, each stored profile specifying a set of values for one or more parameters associated with the second link. Alternatively, the profile management processor may be operable to determine a profile to be applied in respect of the second link by generating a profile, the generated profile specifying a set of values for one or more parameters associated with the second link.

According to preferred embodiments, the performance analyser may also be operable to obtain performance information in respect of the first link of the DSL connection. With such embodiments, the profile to be applied in respect of the second link may be determined in dependence on the performance information obtained in respect of the first link. Such a technique may allow rate-balancing to be applied by the regenerator, for example. This may be applied independently in respect of the upstream and downstream transmissions.

According to preferred embodiments, the second transceiver module may also be operable to receive a modulated signal from the second link of the DSL connection and to demodulate the received signal whereby to obtain user data; the first transceiver module may then be operable to receive the user data obtained by the second transceiver module (i.e. by demodulation of the signal from the second link) and to transmit a modulated signal carrying the user data on to the first link of the DSL connection. With such embodiments, the first transceiver module may be operable to transmit the modulated signal carrying the user data on to the first link in accordance with a profile determined in dependence on performance information obtained in respect of the first link.

According to embodiments such as those set out in the previous paragraph, the second transceiver module may also be operable to demodulate the signal received from the second link whereby to obtain configuration information; and the first transceiver module may be operable to transmit the modulated signal carrying the user data on to the first link in accordance with a profile determined in dependence on the configuration information obtained by the second transceiver module.

According to preferred embodiments, the device may further comprise a data bridge operable to convey user data obtained by one transceiver module to the other transceiver module. The data bridge may be an Ethernet bridge, for example, essentially allowing the signal to be "re-generated" from a binary signal by the regenerator before being transmitted onward (rather than simply amplified, which would result in any noise also being amplified), but techniques using protocols other than Ethernet may also be used. It will be understood that there need not be an actual "bridge" component (Ethernet or otherwise) between the two transceivers in the regenerator, however—they may for example be connected directly, back-to-back, with the output/input of the first transceiver directly linked to the input/output of the other. Another alternative is that one transceiver may place the demodulated user data in a buffer or memory from which the other transceiver may retrieve it.

According to preferred embodiments, the performance information in respect of either or both of the DSL links may comprise indications indicative of whether or not the respective DSL link has experienced instability during one or more predetermined periods. Alternatively, or additionally, the performance information in respect of either or both of the DSL links may comprise indications indicative of whether or not the respective DSL link has re-synchronised during one or more predetermined periods, and/or whether or not errors have occurred in data traversing the respective DSL link during one or more predetermined periods. The performance information in respect of either or both of the DSL links may comprise indications relating to one or more characteristics such as stability, line-rate, latency, signal-to-noise ratio, or others.

According to a second aspect of the invention, there is provided an access network including at least one regenerator device according to any embodiment of the first aspect, the regenerator device being in communication, via a first link of at least one of a plurality of DSL connections, with an aggregation transceiver device at which a plurality of data connections are aggregated for onward connection through the access network, the aggregation transceiver device being operable to provide, over the first link, a modulated signal carrying user data, the regenerator device being in communication, via a second link of the at least one DSL connection, with a user transceiver device and being operable to provide, over the second link, a modulated signal carrying the user data, the modulated signal being provided in accordance with a profile determined in dependence on performance information obtained by the regenerator device in respect of the second link.

According to preferred embodiments of the second aspect, the modulated signal provided by the aggregation transceiver may also carry configuration information in respect of the at least one DSL connection, the regenerator device being operable to provide the modulated signal carrying the user data over the second link in accordance with a profile dependent on the configuration information.

According to a third aspect of the invention, there is provided a method for forwarding user data received in a modulated signal from one link of a Digital Subscriber Line, DSL, connection on to another link of the DSL connection, the method comprising:

receiving, at a first transceiver module of a forwarding device, a modulated signal from a first link of a DSL connection and demodulating the received signal whereby to obtain user data;

receiving, at a second transceiver module of the forwarding device, user data obtained by the first transceiver module and transmitting a modulated signal carrying the user data on to a second link of the DSL connection;

the method further comprising:

obtaining performance information in respect of the second link of the DSL connection; and determining a profile to be applied in respect of the second link, the profile specifying a set of values for one or more parameters associated with the second link, the profile being determined in dependence on the performance information obtained in respect of the second link;

wherein the second transceiver module is operable to transmit a modulated signal carrying the user data on the second link in accordance with the determined profile.

According to preferred embodiments of the third aspect, the modulated signal may also carry configuration information in respect of the DSL connection, and the profile to be applied in respect of the second link may be determined in dependence on the configuration information as well as the performance information obtained in respect of the second link.

The various options and preferred embodiments referred to above in relation to the first aspect are also applicable in relation to the second aspect.

Embodiments of the invention thus relate to DSL regenerators used on DSL connections to split them into two or more DSL links. With such embodiments, at least some DLM processing may be performed on the regenerator itself in order to determine what profile should be applied in respect of a link onward from the regenerator. This can be based on locally-obtained performance information at least for that link. With preferred embodiments, despite being performed on the regenerator, on-board DLM processing can be performed in accordance with configuration information received from a network operator, such as preferences (of the user and/or of the network operator) which can thus influence the on-board DLM processing.

With preferred embodiments, the configuration information may be received from the network operator by "re-using" one or more appropriately-selected existing DSL parameters that have little or no impact on DSL performance on a first DSL link but can serve to provide DLM configuration information to the management and control algorithms for a second (or subsequent) DSL link. This can be done without the need to configure and manage additional management channels to the regenerator or to the second (or subsequent) DSL link(s). By virtue of this, it becomes possible to perform DLM processing on regenerators and improve performance in respect of DSL links extending from regenerators while avoiding the cost and complexity of additional management channels.

In particular, such embodiments allow sufficient information to be provided to regenerators for DLM profiles to be applied by regenerators in respect of onward links therefrom even if the communication channel to the regenerator is of very limited capacity in terms of spare volume of data. By providing sufficient configuration information (such as stability preferences, for example) to allow the actual DLM processing to be performed on the regenerator itself based on locally-obtained performance information, it is unnecessary to send data indicative of a complete, already-determined profile over the communication channel concerned.

BRIEF DESCRIPTION OF THE DRAWINGS

A preferred embodiment of the present invention will now be described with reference to the appended drawings, in which.

DESCRIPTION OF PREFERRED
EMBODIMENTS OF THE INVENTION

With reference to the accompanying figures (and in particular to FIGS. 3 and 4), regenerators according to preferred embodiments will be described, together with preferred manners in which such regenerators may operate. The description will explain in particular how DLM configuration information may be passed to and interpreted by a regenerator according to a preferred embodiment, used by a DLM Engine module on such a regenerator, and when required used to trigger a reset of the DLM profile and DLM Engine configuration on a customer-side DSL link extending from the regenerator to a customer (or towards a customer, in cases where there are multiple regenerators, for example).

For the purposes of this description, reference will be made principally to an implementation in the context of a VDSL2 line, but it will be understood that embodiments of the invention are applicable in the context of technologies other than VDSL2 (such as ADSL and variants thereof). In relation to this, it should be noted that DLM algorithms are generally configured by setting a product and policy. In the case of the applicant's current "Next Generation Access" (NGA) VDSL2 product, there are three product options, referred to as "80/20", "40/10" and "40/2" (where the numbers refer to "[downstream rate]/[upstream rate]") and three DLM policies, referred to as "speed", "standard" and "stable", which indicate the error and retrain targets within which a DLM system should attempt to keep each line, using its system-implemented DLM algorithm. These terms will be used in relation to the VDSL2 example, but it will be understood that other terms may be applicable in other contexts, and with other arrangements of profiles, including "vector of profiles" arrangements, for example.

Figure 3:
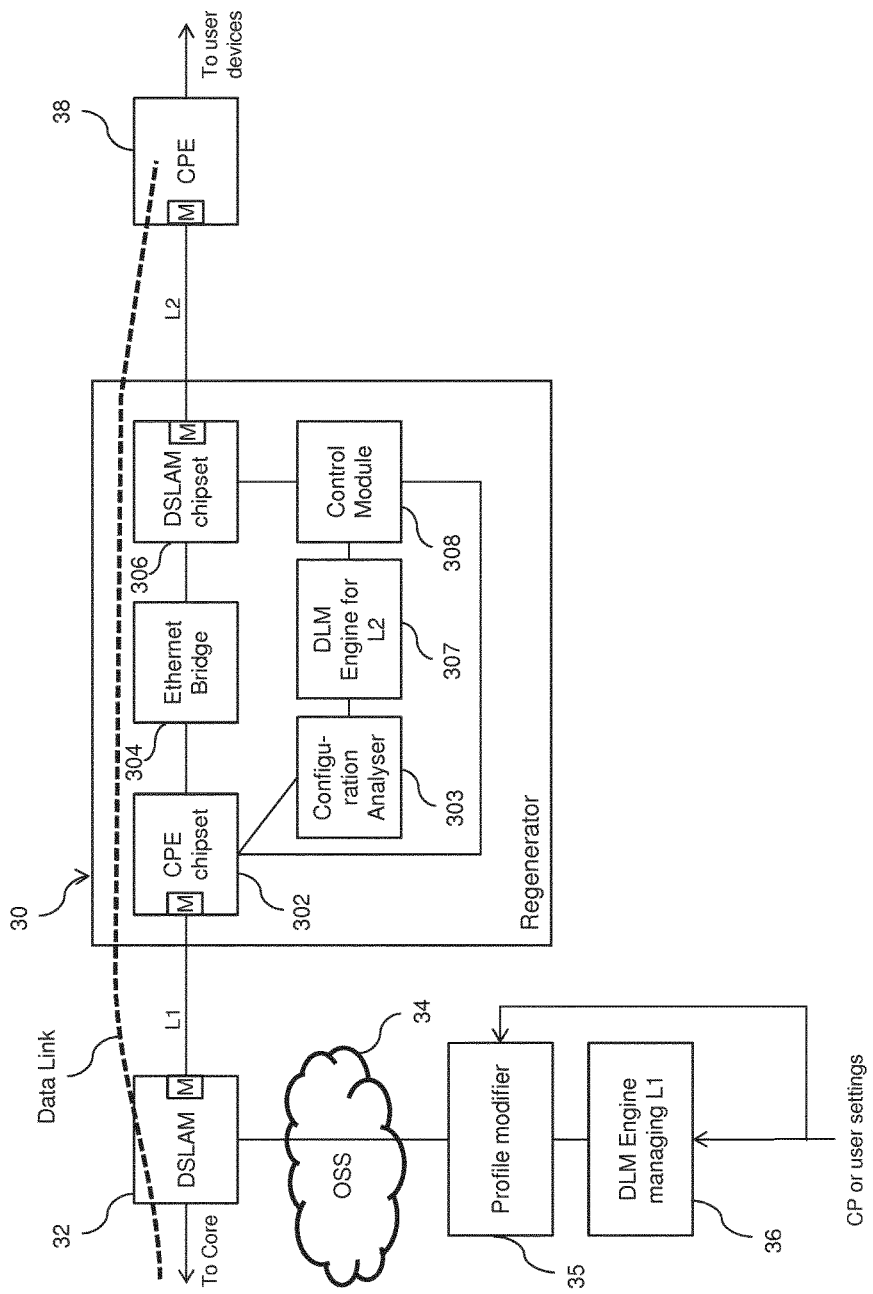
FIG. 3 shows a regenerator according to a preferred embodiment.

Referring to FIG. 3, this illustrates the principal functional modules involved in the operation of a regenerator 30 according to a preferred embodiment. The regenerator 30 of FIG. 3 is shown being used on a DSL connection between a DSLAM 32 and CPE 38, with DSL link L1 being connected to the regenerator 30 via a modem in CPE chipset 302 and DSL link L2 being connected to the regenerator 30 via a modem in DSLAM chipset 306. It will be noted that in the case of ADSL/ADSL2/ADSL2+, the DSLAM 32 would generally be at an exchange, whereas in the case of VDSL/VDSL2, the DSLAM 32 would generally be in a cabinet (and in the case of G.fast, the DSLAM 32 would generally be at the drop-point, etc.).

Figure 1:
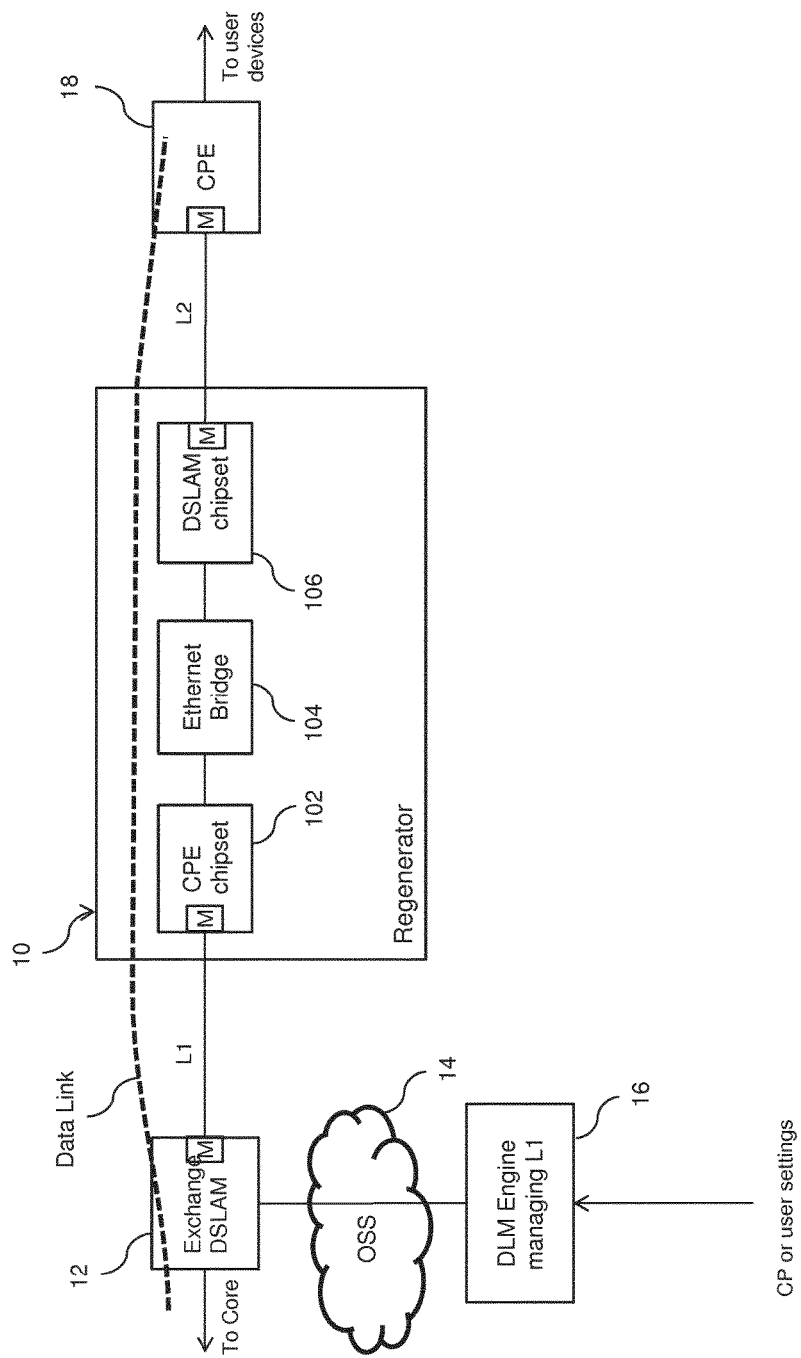
FIG. 1 shows a standard DSL regenerator being used on a DSL connection.

As with the standard regenerator shown in FIG. 1, there is, in this embodiment, an Ethernet bridge 304 between the two chipsets. A control module 308 is in communication with each chipset. It will be noted that unlike in the case of the regenerator of FIG. 2, no separate management link is shown. As will become apparent, this is because in the case of the regenerator of FIG. 3, there is generally no need for a separate management link such as that in FIG. 2 to carry management traffic.

A DLM Engine module 307 is present on the regenerator itself, in communication with the control module 308 and an additional module which will be referred to as a configuration analyser 303, the role of which will be explained below.

As with a standard regenerator 10, in respect of user data travelling towards the user, the CPE chipset 302 on regenerator 30 terminates link L1 and produces a data stream (in this case Ethernet) which the DSLAM chipset 306 receives via Ethernet bridge 304 and re-modulates for onward transmission on link L2. The chipsets perform the reverse functions in respect of user data travelling from the user.

The control module 308 is operable to provide a management function in relation to one or both of the chipsets, which may include any fixed configuration information that may be desired or required before deployment, such as, for example, a VDSL2 band plan, i.e. the frequencies used for respective upstream and downstream transmissions, in addition to updated configuration information that may be desired or required once the regenerator has been deployed. As will be discussed later, it may also perform rate-balancing between the respective links, limiting the rate on link L2 based on previous rates observed on link L1 and/or limiting the rate on link L1 based on previous rates observed on link L2. Such rate-balancing may be implemented as a part of the DLM processing or separately. Also, the control module 308 may decide if and when to drop either link if the other link has dropped.

Similarly to FIG. 1, the functionality of an operator's complete DLM system and of an operator's OSS in general insofar as it affects the DSL connection between the DSLAM 32 and the CPE 38 is represented by OSS 34 and DLM Engine 36, but it will be noted that an additional functional component, referred to as a profile modifier 35, is shown in the operator-side infrastructure. The role of this will be explained below.

In general, the DLM Engine module 307 on regenerator 30 may perform a similar function itself in respect of link L2 as the operator's DLM Engine 36 performs in respect of link L1, and may have available for link L2 the same DLM profiles as are available for link L1.

Generally, DLM Engines receive performance data for each DSL line under their control and monitor the performance, and in particular the stability, of those lines. In this instance, the operator's DLM Engine 36 performs that function in respect of link L1, while the regenerator's DLM Engine module 307 performs a corresponding function in respect of link L2. If the performance of a link is outside a set of thresholds, generally selected by the operator or communications provider, then the DLM engine uses its DLM algorithm to determine an appropriate course of action in order to bring the line back within the thresholds. The action normally requires selecting a new profile for the link which changes some of the configuration parameters of that link. For example, if a line is too unstable, as indicated by too many errors or retrains, for example, the decision of the DLM engine according to the algorithm may be to apply error correction to the line and/or to reduce line rate to improve stability. As noted before, performance management of DSL lines generally involves a trade-off, for example, enabling Reed-Solomon error correction and Interleaving to correct errors results in slightly reduced bit rates and increased latency. Hence, if a line is more stable than required for the services operated over it the DLM algorithm may select a profile with less error correction capability and/or a faster rate.

As indicated earlier, the control module 308 in the regenerator 30 may also implement a rate-balancing algorithm. Having visibility of both links L1 and L2, it may for example record the maximum rate observed over the last ten retrains on L1 and L2 and limit each side to 10% above the maximum seen on the other. Such rate-balancing could be applied to both upstream and downstream transmissions independently. In addition the maximum rates upstream and downstream may be recorded since the last DLM reset. In the case of the NGA products described earlier, for example, if the maximum rates both downstream and upstream are less than "40" and "2" then the product may be assumed to be "40/2"; if not then if both downstream and upstream rates are less than "40" and "10" then the product may be assumed to be "40/10"; otherwise the product may be assumed to be "80/20". Link L2 may then be capped by the assumed product limit in addition to the "10% rule" set out above.

The control module 308 may be configured to implement other functions. It may be configured to cause a retrain on link L1 if link L2 retrains, for example, or to apply the same error correction on link L2 as is being applied on link L1.

To avoid the performance of the two links affecting each other unnecessarily, however, the control module may be configured such that it doesn't automatically cause the link on one side to be dropped if the link on the other side retrains. This may have the benefit that the recovery time after one side drops out is quick. A long period in which one link is active while the other is inactive may cause performance data in respect of the active link to be misleading about its performance, or cause other problems, so a further rule may be used, ensuring for example that if L1 or L2 drops out of sync for more than 60 seconds the other link is also dropped.

As indicated above, the DLM Engine 36 for link L1 operates essentially in the usual manner, analysing the data from link L1 and determining new profiles to be applied in accordance with an appropriate DLM algorithm as required to manage the performance of the L1 link. As part of this operation, various DSL parameters are included in a message to be sent from the modem in DLM Engine 36 to the modem the other side of the link concerned (which would be the modem in the CPE 38 if there were no regenerator, but will be the modem in the CPE chipset 302 where there is a regenerator. These parameters are sent in a predetermined format, according to an agreed protocol, in order to carry information to the receiving modem that it may need. Of these, one or more parameters may not be needed by the receiving modem, and may have little or no effect on the performance on the link concerned. In the present example, one such parameter is "MAXSNRMds", which can be used to hold a value for the MAXimum signal-to-noise (SNR) Margin in the downstream direction. This can be made essentially redundant by appropriate use of other parameters and settings, and is not used the present applicant to manage connections in its networks at all, so is generally set in systems under the control of the present applicant at a fixed value of 31 dB, which is the maximum value allowed according to the standard. The significance of this will become apparent later, but it should be noted that other parameters may be similarly "redundant" in the applicant's and/or other operators' networks, so could be chosen instead for similar reasons.

We turn now to the functions performed principally by or with the assistance of the additional elements referred to above, namely the profile modifier 35 (on the operator-side) and the configuration analyser 303 (on the regenerator 30). These functions relate primarily to the provision to the regenerator 30 of configuration information (such as settings or preferences from the communications provider or user) such that this can be used by the DLM Engine module 307 on the regenerator 30 in conjunction with performance data in DLM processing by the DLM Engine module 307 performed in order to determine an appropriate profile or appropriate profile settings to be applied in respect of link L2.

Of the parameters used in the configuration of lines using DLM, there are some (such as the "MAXSNRMds" parameter referred to above) to which changes (or at least minor changes) can be made that have little or no impact on the performance of the line(s) in question. One or more of these parameters can therefore be used in order to convey alternative information (i.e. information other than that for which the parameter was originally intended) as part of the data modulated on to a DSL signal and sent via a DSL link to a device such as a regenerator. This can be done without needing to set up additional or dedicated communication and/or management channels for that information. A suitably-enabled regenerator, on demodulating the signal, can then obtain the alternative information and use it accordingly.

According to preferred embodiments, one or more parameters such as the MAXSNRMds parameter referred to above is selected and used in the above manner to carry additional information such as configuration information on a DSL link (such as link L1) from an operator-side DSLAM to a regenerator. As explained below, a suitably-enabled regenerator according to a preferred embodiment will then be able to obtain the additional information from the modulated signal it receives and use it in DLM processing performed on the regenerator in respect of a DSL link (such as link L2) onward from the regenerator.

In respect of the present embodiment, the standard profile set required for managing link L1 is expanded to include one or more variants of each profile, each variant having a different value of the selected parameter(s).

The profile modifier 35 performs the following:
it takes configuration information intended to be used for processing in respect of link L2 and encodes this information into the selected parameter value (or values);
it takes the original profile selected for link L1 by the operator's DLM Engine 36 and introduces into the parameters for this this the new value(s) for the selected parameter(s), thereby creating one of the profile variants;
it provides the new profile selection to the DSLAM 32 for use in respect of link L1.

The DSLAM 32 is then able to transmit to the regenerator 30 via link L1 a modulated DSL signal in accordance with the profile selected for L1 that carries, in modulated form, user data intended for the customer (via CPE 38) and DSL data in respect of link L1 for the CPE chipset 302, and also includes DLM configuration information in the form of the selected profile variant and/or any modified DLM parameters, for use by the regenerator 30 (and in particular by the DLM Engine module 307) in respect of link L2.

In respect of the above, it will be noted that a corresponding process could also be done using a vector of profiles. In this case, the profile modifier 35 might only change one part of the vector of the profile.

Also, in some cases, DLM engines control the parameters on a DSLAM individually, in which case the profile modifier 35 could change the selected parameter rather than the whole profile.

Further, in some cases, the operator-side DLM Engine 36 may monitor the actual profile on link L1 through data collection from the DSLAM 32. The profile modifier 35 may also act on this collected data to convert the actual line profile name into one that is understood by the DLM engine 36.

It will be understood that the profile modifier 35 need not be a separate device—it could be built into a modified version of the operator-side DLM Engine 36.

Turning now to the functionality of the regenerator 30, this receives the modulated signal at the CPE chipset 302 and demodulates it in the usual manner, passing a (binary) data stream containing the user data via the Ethernet bridge 304 to the DSLAM chipset 306 for re-modulation and onward transmission on link L2. In addition to this (generally standard) functionality, the configuration analyser 303 on the regenerator monitors the configuration values received and stored in CPE chipset 302 from the DSLAM 32 and obtains therefrom the selected parameter(s) in order to obtain the additional configuration information that has been encoded into the signal by the profile modifier 35. This configuration information is provided to the DLM Engine module 307.

The DLM Engine module 307, which generally has available to it performance data for link L2 (received from the DSLAM chipset 306), is then able to perform DLM analysis of the locally-obtained performance data according to its DLM algorithm, and to determine a suitable profile to be applied by the DSLAM chipset 306 in respect of transmissions on link L2 in accordance with the additional configuration information that was encoded into the signal sent from the DSLAM 32 to the regenerator 30.

Turning now to possible parameters that may be "re-used" in the manner set out above, in the exemplary case of VDSL2, any of a number of suitable parameters within the VDSL2 standard may be used by the profile modifier, some of which are considered below. Correspondingly, in other versions of DSL, a number of parameters within the respective standard may be used.

Table 12-49 in G.993.2 (VDSL2) describes the parameters that are generally sent from a VDSL2 Transceiver Unit at the Optical Network Unit (VTU-O) to a VDSL2 Transceiver Unit at a Remote site (VTU-R) chipset during a channel analysis and exchange phase of training up a link between the VTU-O and VTU-R. These parameters generally relate to capabilities and downstream configuration. A subset of these parameters is shown in Table 1 below. These are particularly suitable in relation to the present embodiment because they are directly configurable in the profile applied to the VTU-O chipset.

TABLE 1

Excerpt from Table 12-49 of G.993.2 - Description of message O-MSG 1

| | Field name | Format |
|---|---|---|
| 2 | Downstream target SNR margin (TARSNRMds) | 2 bytes |
| 3 | Downstream minimum SNR margin (MINSNRMds) | 2 bytes |
| 4 | Downstream maximum SNR margin (MAXSNRMds) | 2 bytes |
| 9 | Downstream Rate adaptation downshift SNR margin (RA-DSNRMds) | 2 bytes |
| 10 | Downstream Rate adaptation downshift time interval (RA-DTIMEds) | 2 bytes |
| 11 | Downstream Rate adaptation upshift SNR margin (RA-USNRMds) | 2 bytes |
| 12 | Downstream Rate adaptation upshift time interval (RA-UTIMEds) | 2 bytes |

TARSNRMds and MAXSNRMds are also sent in the O-SIGNATURE message (another message sent between the VTU-O and VTU-R) during the Channel Discovery phase between the VTU-O and VTU-R.

Parameters 9 to 12 are configuration parameters for Seamless Rate Adaption (SRA), and are passed as part of the "train-up" phase. Even if the rate adaption mode isn't enabled, they could be correctly populated, or could be used to pass default or null values rather than the operator configured values, but could be used in the manner explained above.

The parameters listed above are transferred to the VTU-R chipset during synchronisation and are generally readable by connected modules in a regenerator (i.e. so may be received and stored in the CPE chipset 302 and read by the configuration analyser 303 in regenerator 30). Although the exact protocol and method for reading these parameters is generally proprietary, so may be different for different chipset vendors, this could be done using a Serial Peripheral Interface (SPI) to access the relevant read-only registers on the VTU-R.

This example focuses on MAXSNRMds, but other parameters or a combination thereof could be used. In the applicant's VDSL2 profiles, as explained earlier, MAXSNRMds is typically set to the maximum valid value and has very little, if any, impact on the performance of the circuit. Valid values are those between 0 and 31 dB, in 0.1 dB steps. In this case, the possible DLM policies are assigned to different values as set out in Table 2.

TABLE 2

Policy Values for DLM Policies

| Policy | PolicyValue |
|---|---|
| Speed | 0 |
| Standard | 1 |
| Stable | 2 |

The maximum SNR can then be computed using the following formula:

$$MAXSNRMds = 31 - PolicyValue * 0.1 - ResetToggle$$

(NB A table could be used instead of a formula, or other methods could be used for the conversion, depending on the required function and/or the parameter(s) concerned.)

In the present embodiment, using the above formula, the following values may be used:

The default value of ResetToggle is 0 and the valid values are {0, 1}.

The valid values of PolicyValue are {0, 1, 2}.

The possible set of MAXSNRMds values are therefore {31.0, 30.9, 30.8, 30.0, 29.9, 29.8} The profiles available on the DSLAM 32 are increased and each profile is replaced by six new profiles (with slightly different names) having different values of MAXSNRMds.

The profile modifier 35 stores the current PolicyValue and the ResetToggle, based on input from the CP or on user settings. Each time a DLM reset is requested, the ResetToggle value is changed. Each time a new profile is issued from DLM analyser 36, the profile modifier 35 takes the required profile/line configuration, combines this with the MAXSNRMds value computed as above, and passes on that profile name to the OSS 34 for implementation on link L1 by DSLAM 32.

Where performance data (including actual profile name) is passed from link L1 through the OSS 34 to the DLM analyser 36, the profile modifier 35 converts the actual profile name back into a profile name that the DLM analyser 36 can understand.

The configuration analyser 303 on the regenerator 30 monitors the value of MAXSNRMds passed to the VTU-R chipset (i.e. in this case, the CPE chipset 302 on the regenerator 30) and computes the following (noting that as with the formula for MAXSNRMds, a table could be used instead):

$$ResetToggle = ABS(CEILING(MAXSNRMds, 1) - 31)$$

$$PolicyValue = ABS(MAXSNRMds - 31 + ResetToggle) * 10$$

PolicyValue can be used to configure the DLM algorithm on the regenerator's DLM Engine module 307 to be used in respect of link L2, and when ResetToggle changes, the DLM profile and configuration for link L2 is reset.

Other formulae could be devised and used to encode configuration information onto parameters from Table 12-49 of G.993.2 such as those listed in Table 1 above, of course.

Figure 2:
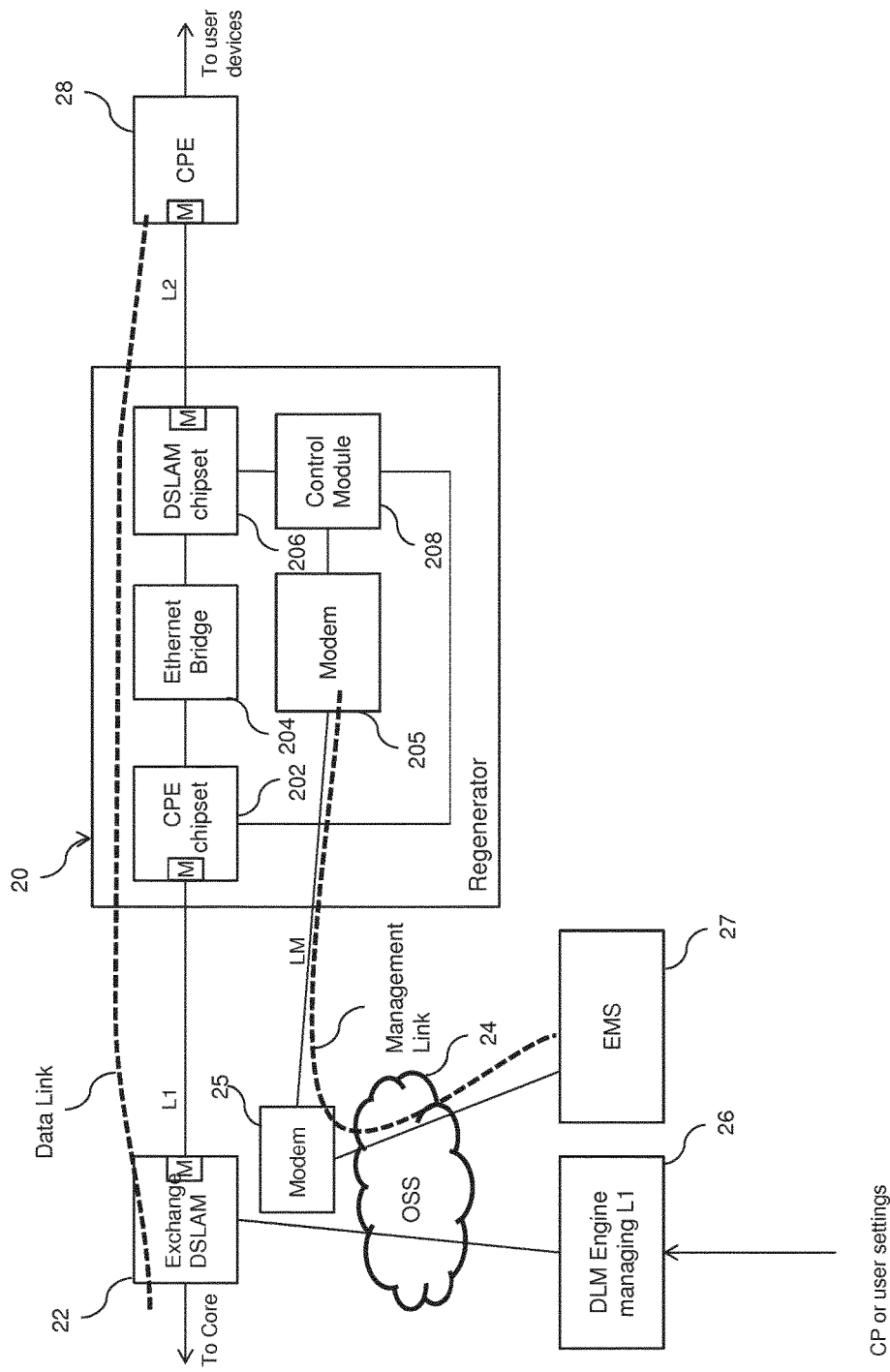
FIG. 2 shows a DSL regenerator with an additional communication channel being used on a DSL connection.
Figure 4:
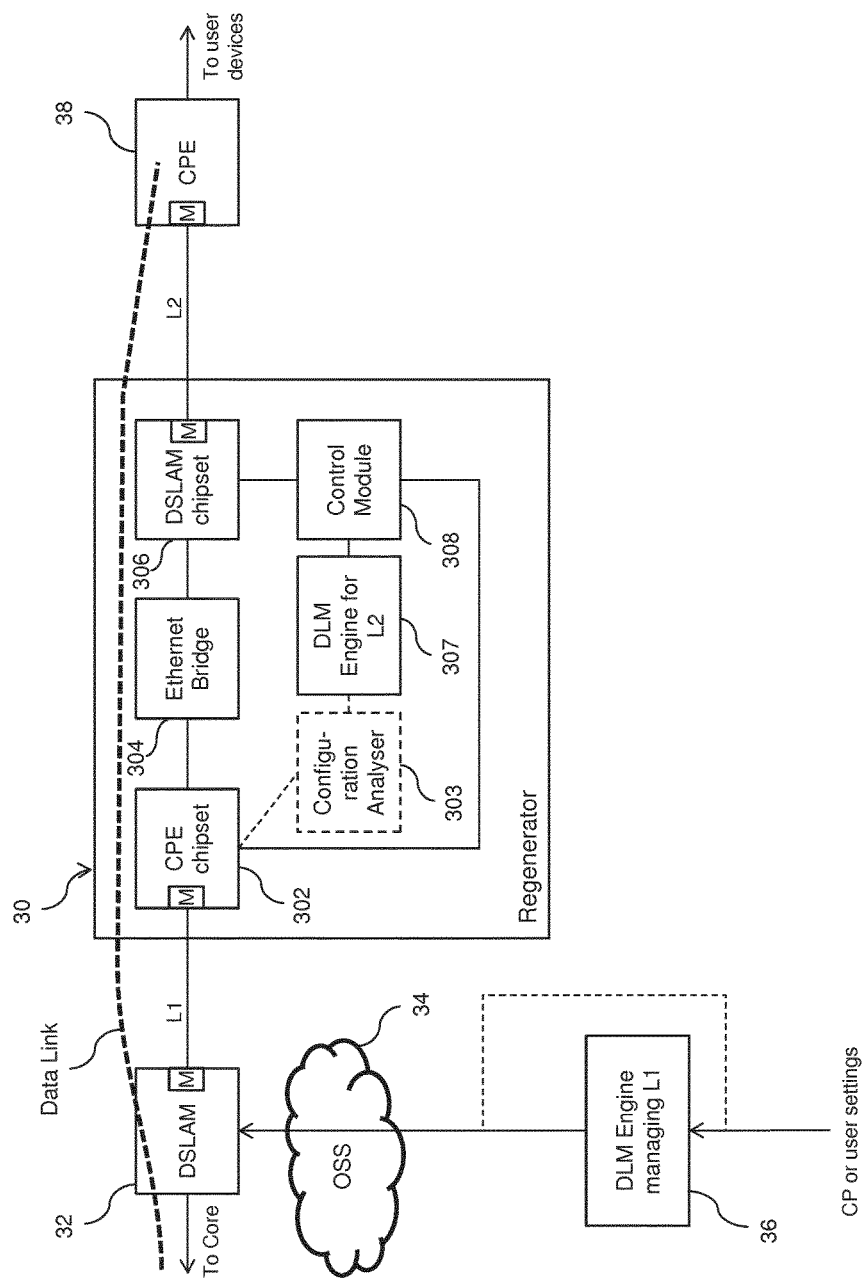
FIG. 4 shows a regenerator according to an alternative embodiment.

Referring to FIG. 4, this illustrates the principal functional modules involved in the operation of a regenerator 30 according to an alternative embodiment. Many of the elements in this embodiment perform operations the same as or corresponding to those performed by elements of the embodiment shown in FIG. 3, so will not be described again in detail. In this embodiment, however, it will be seen that there is no profile modifier 35 on the operator-side. Instead of modifying the profile for link L1 in order to "re-use"

parameters in the manner explained above to encode therein configuration information or profile determination preference information such as user settings intended to be used for DLM processing in respect of link L2, any profile determination preference information or configuration information may be sent separately from the profile parameters for link L1, either over link L1 (as shown) or possibly via an alternative communication channel (such as a separate management link, not shown in FIG. 4, but similar to that shown in FIG. 2, for example). Any such configuration information or profile determination preference information may be received by the configuration analyser 303 as with the embodiment shown in FIG. 3 which may pass it on to the regenerator's DLM engine module 307, in order to allow the "on-board" DLM processing in respect of link L2 to be performed in dependence thereon. The network operator may thus update any such profile determination preference information to be used in the "on-board" DLM processing on an ongoing basis. It is also possible for the on-board DLM processing to be performed on the regenerator on the basis of locally-obtained performance information without using configuration information or profile determination preference information received from elsewhere.

The invention claimed is:

1. A regenerator device for forwarding user data, said user data being received in a first modulated signal from a first link of a Digital Subscriber Line, DSL, connection, and transmitted onward in a second modulated signal on a second link of the DSL connection, the regenerator device comprising:
    a first transceiver module operable to receive the first modulated signal from the first link of the DSL connection and to demodulate the received signal whereby to obtain said user data; and
    a second transceiver module operable to receive said user data obtained by the first transceiver module and to transmit the second modulated signal carrying the user data on to the second link of the DSL connection;
    the regenerator device further comprising:
    a performance analyser operable to obtain performance information in respect of the second link of the DSL connection; and
    a profile management processor operable to determine a profile to be applied in respect of the second link, the profile specifying a set of values for one or more parameters associated with the second link, the profile being determined by the profile management processor in dependence on the performance information obtained in respect of the second link;
    wherein the second transceiver module is operable to transmit said second modulated signal carrying the user data on the second link in accordance with the profile determined by the profile management processor.

2. A regenerator device according to claim 1, the regenerator device also being operable to receive profile determination preference information, and wherein the profile management processor is operable to determine the profile to be applied in respect of the second link in dependence on the profile determination preference information and on the performance information obtained in respect of the second link.

3. A regenerator device according to claim 1, the first signal received from the first link of the DSL connection by the first transceiver module carrying configuration information in respect of the DSL connection, the first transceiver module being operable to demodulate the received signal whereby to obtain said user data and configuration information; the device further comprising a configuration analyser operable to obtain, from the configuration information obtained by the first transceiver module, profile determination preference information in dependence on which the determination of the profile to be applied in respect of the second link is then made by the profile management processor.

4. A regenerator device according to claim 3, wherein the configuration information comprises values for a set of parameters each having a first pre-defined meaning according to a first pre-defined communication protocol, and wherein the configuration analyser is operable to interpret a subset of one or more parameters from the set of parameters according to a second pre-defined communication protocol as having a second pre-defined meaning, said second communication protocol differing from said first communication protocol, and said second meaning differing from said first meaning, thereby to derive said profile determination preference information from the values for the one or more parameters in the subset of parameters.

5. A regenerator device according to claim 1, wherein the profile management processor is operable to determine a profile to be applied in respect of the second link by selecting a profile from a plurality of stored profiles, each stored profile specifying a set of values for one or more parameters associated with the second link.

6. A regenerator device according to claim 1, wherein the profile management processor is operable to determine a profile to be applied in respect of the second link by generating a profile, the generated profile specifying a set of values for one or more parameters associated with the second link.

7. A regenerator device according to claim 1, wherein the performance analyser is operable to obtain performance information in respect of the first link of the DSL connection.

8. A regenerator device according to claim 7, wherein the profile to be applied in respect of the second link is determined in dependence on the performance information obtained in respect of the first link.

9. A regenerator device according to claim 1, wherein the second transceiver module is further operable to receive a modulated signal from the second link of the DSL connection and to demodulate the received signal whereby to obtain user data; and the first transceiver module is operable to receive user data obtained by the second transceiver module and to transmit a modulated signal carrying the user data on to the first link of the DSL connection.

10. A regenerator device according to claim 9, wherein the first transceiver module is operable to transmit the modulated signal carrying the user data on to the first link in accordance with a profile determined in dependence on performance information obtained in respect of the first link.

11. A regenerator device according to claim 9, wherein the second transceiver module is further operable to demodulate the signal received from the second link whereby to obtain configuration information; and wherein the first transceiver module is operable to transmit the modulated signal carrying the user data on to the first link in accordance with a profile determined in dependence on the configuration information obtained by the second transceiver module.

12. A regenerator device according to claim 1, wherein the device further comprises a data bridge operable to convey user data obtained by one transceiver module to the other transceiver module.

13. A regenerator device according to claim 1, wherein the performance information in respect of either or both of the DSL links comprises indications indicative of whether or not the respective DSL link has experienced instability during one or more predetermined periods.

14. A regenerator device according to claim 1, wherein the performance information in respect of either or both of the DSL links comprises indications indicative of whether or not the respective DSL link has re-synchronised during one or more predetermined periods.

15. A regenerator device according to claim 1, wherein the performance information in respect of either or both of the DSL links comprises indications indicative of whether or not errors have occurred in data traversing the respective DSL link during one or more predetermined periods.

16. A regenerator device according to claim 1, wherein the performance information in respect of either or both of the DSL links comprises indications relating to one or more characteristics selected from: stability, line-rate, latency, signal-to-noise ratio.

17. An access network including a regenerator device according to claim 1, the regenerator device being in communication, via a first link of at least one of a plurality of DSL connections, with an aggregation transceiver device at which a plurality of data connections are aggregated for onward connection through the access network, the aggregation transceiver device being operable to provide, over the first link, a modulated signal carrying user data, the regenerator device being in communication, via a second link of the at least one DSL connection, with a user transceiver device and being operable to provide, over the second link, a modulated signal carrying the user data, the modulated signal being provided in accordance with a profile determined in dependence on performance information obtained by the regenerator device in respect of the second link.

18. An access network according to claim 17, wherein the modulated signal provided by the aggregation transceiver also carries configuration information in respect of the at least one DSL connection, the regenerator device being operable to provide the modulated signal carrying the user data over the second link in accordance with a profile dependent on the configuration information.

19. A method for forwarding user data, said user data being received in a first modulated signal from a first link of a Digital Subscriber Line, DSL, connection, and transmitted onward in a second modulated signal on a second link of the DSL connection, the method comprising:
   receiving, at a first transceiver module of a forwarding device, the first modulated signal from the first link of said DSL connection and demodulating the received signal whereby to obtain user data; and
   receiving, at a second transceiver module of the forwarding device, said user data obtained by the first transceiver module and transmitting the second modulated signal carrying the user data on the second link of the DSL connection;
   the method further comprising:
   obtaining performance information in respect of the second link of the DSL connection; and
   determining a profile to be applied in respect of the second link, the profile specifying a set of values for one or more parameters associated with the second link, the profile being determined in dependence on the performance information obtained in respect of the second link;
   wherein the second transceiver module is operable to transmit athe second modulated signal carrying the user data on the second link in accordance with the determined profile.

20. A method according to claim 19, wherein the first modulated signal also carries configuration information in respect of the DSL connection, and wherein the profile to be applied in respect of the second link is determined in dependence on the configuration information as well as the performance information obtained in respect of the second link.

21. A regenerator device for forwarding user data, said user data being received in a first modulated signal from a first link of a Digital Subscriber Line, DSL, connection, and transmitted onward in a second modulated signal on a second link of the DSL connection, the regenerator device comprising:
   a first transceiver circuitry configured to receive the first modulated signal from the first link of the DSL connection and to demodulate the received signal whereby to obtain said user data; and
   a second transceiver circuitry configured to receive said user data obtained by the first transceiver circuitry and to transmit the second modulated signal carrying the user data on to the second link of the DSL connection; and
   a processing system, including at least one computer processor, the processing system being at least configured to:
      obtain performance information in respect of the second link of the DSL connection; and
      determine a profile to be applied in respect of the second link, the profile specifying a set of values for one or more parameters associated with the second link, and the profile being determined in dependence on the performance information obtained in respect of the second link;
   wherein the second transceiver circuitry is configured to transmit said second modulated signal carrying the user data on the second link in accordance with the profile.

22. A regenerator device according to claim 21, wherein the processing system is further configured to:
   receive profile determination preference information, and
   determine the profile to be applied in respect of the second link in dependence on the profile determination preference information and on the performance information obtained in respect of the second link.

23. A regenerator device according to claim 21, wherein:
   the first signal received from the first link of the DSL connection by the first transceiver circuitry carries configuration information in respect of the DSL connection;
   the first transceiver circuitry is configured to demodulate the received signal to obtain said user data and configuration information; and
   the processing system is further configured to obtain, from the configuration information obtained by the first transceiver circuitry, profile determination preference information in dependence on which determination of the profile to be applied in respect of the second link is then made by the processing system.

24. A regenerator device according to claim 21, wherein:
   the second transceiver circuitry is further configured to receive a modulated signal from the second link of the DSL connection and to demodulate the received signal to obtain user data; and
   the first transceiver circuitry is further configured to receive user data obtained by the second transceiver circuitry and to transmit a modulated signal carrying the user data on to the first link of the DSL connection.

25. A regenerator device according to claim 21, further comprising a data bridge configured to convey user data obtained by one transceiver circuitry to the other transceiver circuitry.

* * * * *